Aug. 15, 1939.  W. F. KANNENBERG  2,169,842
ELECTRONIC ORGAN
Filed April 24, 1936    10 Sheets-Sheet 2
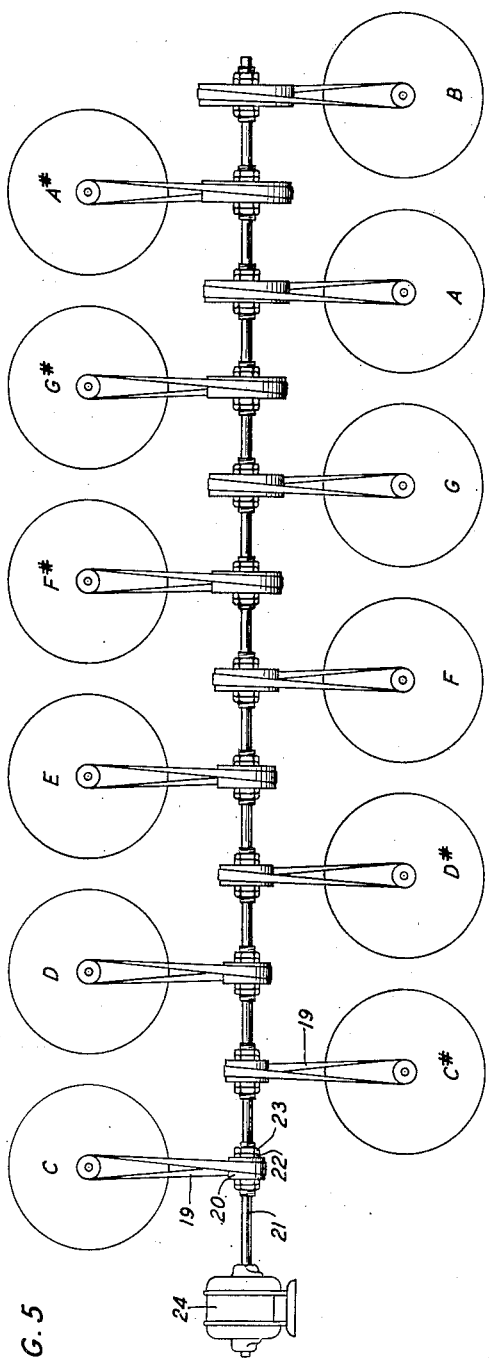
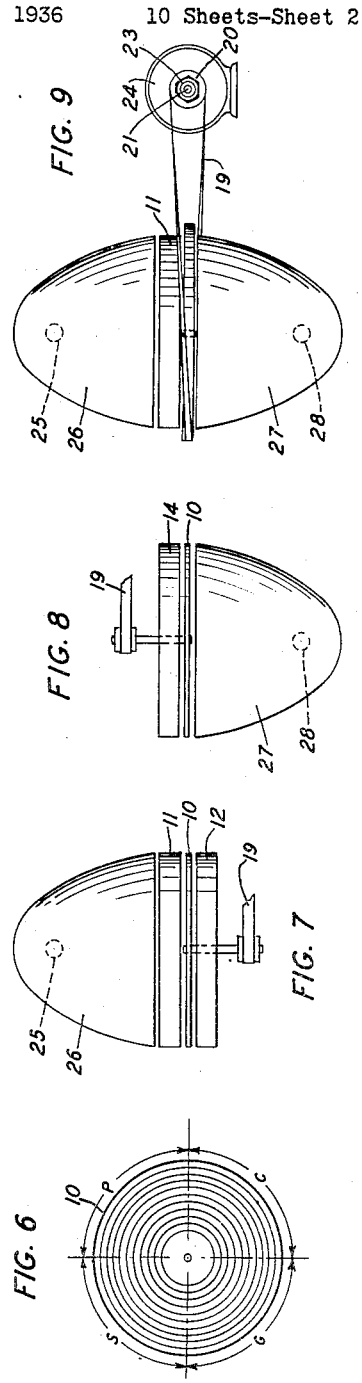
INVENTOR
W. F. KANNENBERG
BY
ATTORNEY Aug. 15, 1939.     W. F. KANNENBERG     2,169,842
ELECTRONIC ORGAN
Filed April 24, 1936     10 Sheets-Sheet 3

INVENTOR
W. F. KANNENBERG
BY
*J. M. Campbell*
ATTORNEY

Aug. 15, 1939.  W. F. KANNENBERG  2,169,842
ELECTRONIC ORGAN
Filed April 24, 1936  10 Sheets-Sheet 4
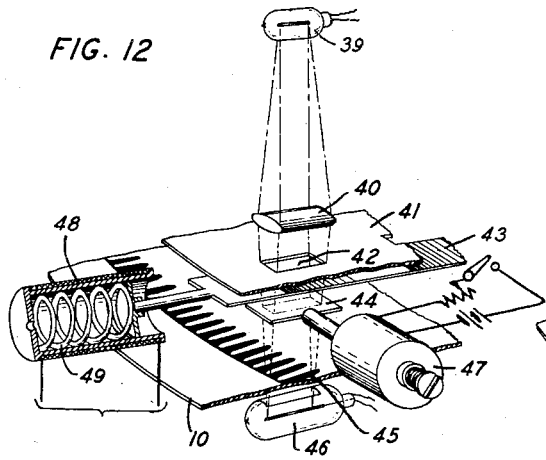
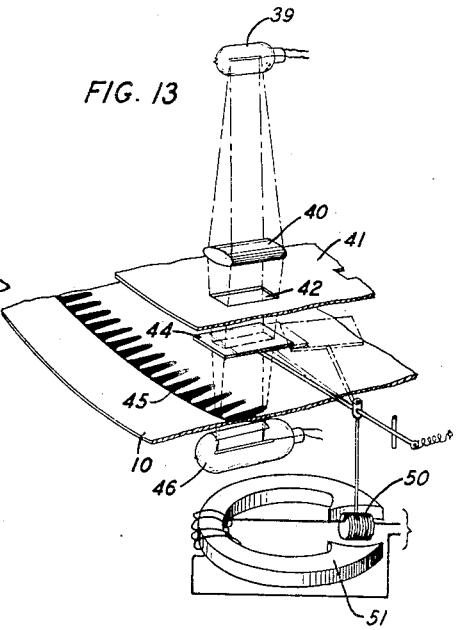
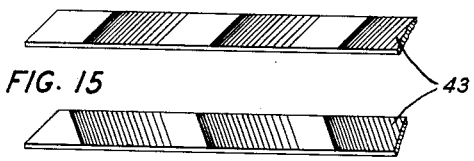
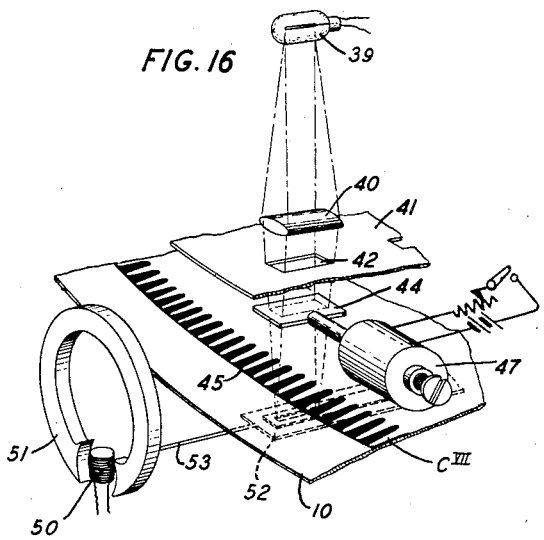
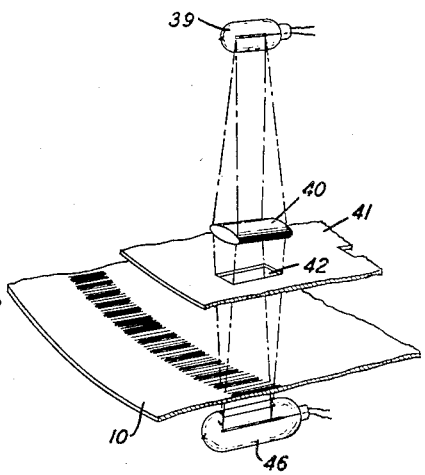
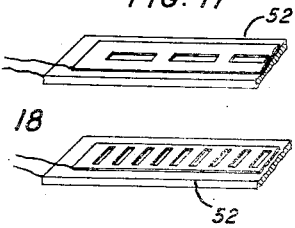
INVENTOR
W. F. KANNENBERG
BY
ATTORNEY Aug. 15, 1939.  W. F. KANNENBERG  2,169,842
ELECTRONIC ORGAN
Filed April 24, 1936   10 Sheets-Sheet 5

INVENTOR
W. F. KANNENBERG
BY
ATTORNEY

Aug. 15, 1939.　　　W. F. KANNENBERG　　　2,169,842
ELECTRONIC ORGAN
Filed April 24, 1936　　　10 Sheets-Sheet 6

INVENTOR
W. F. KANNENBERG
BY
ATTORNEY

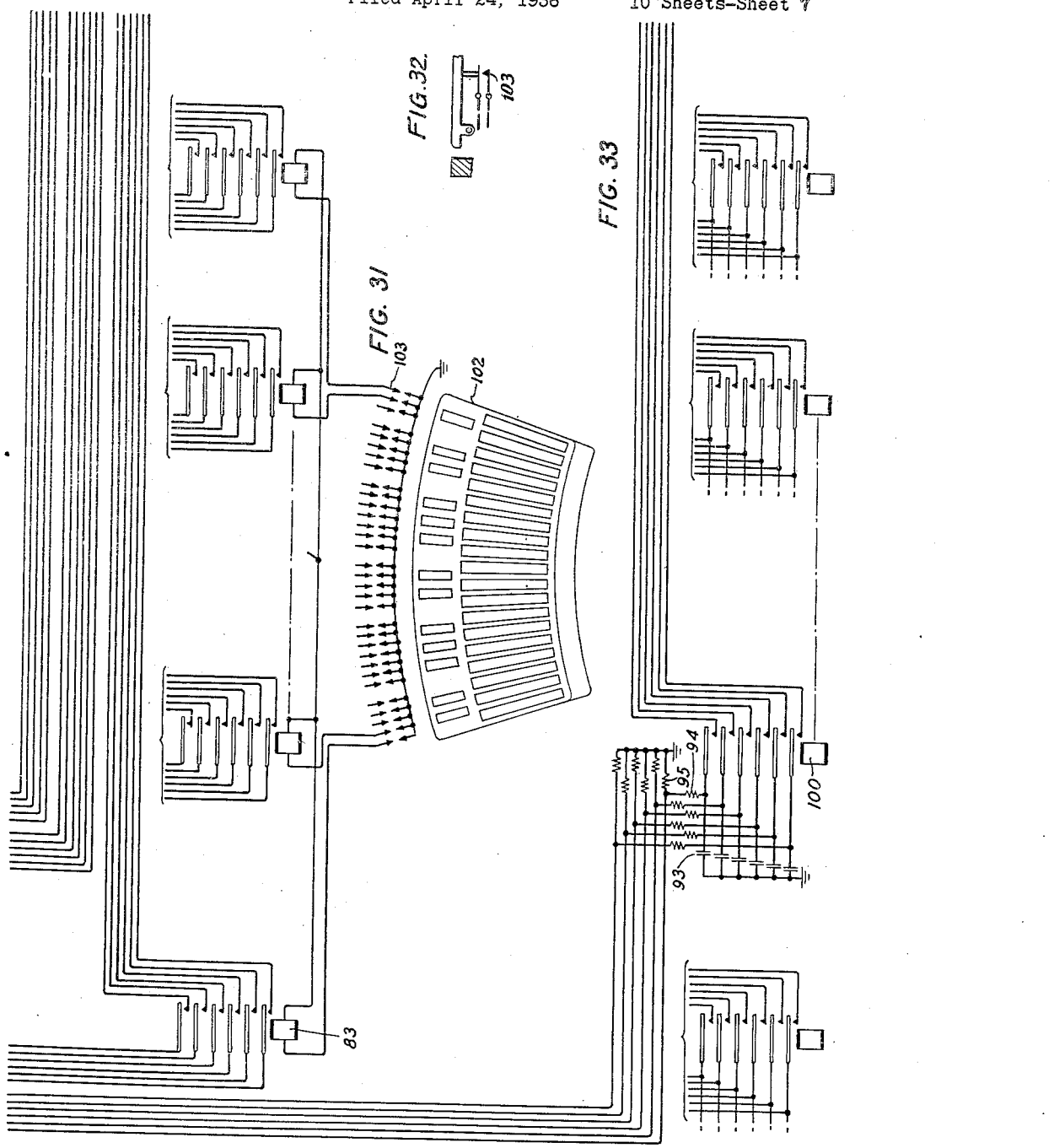

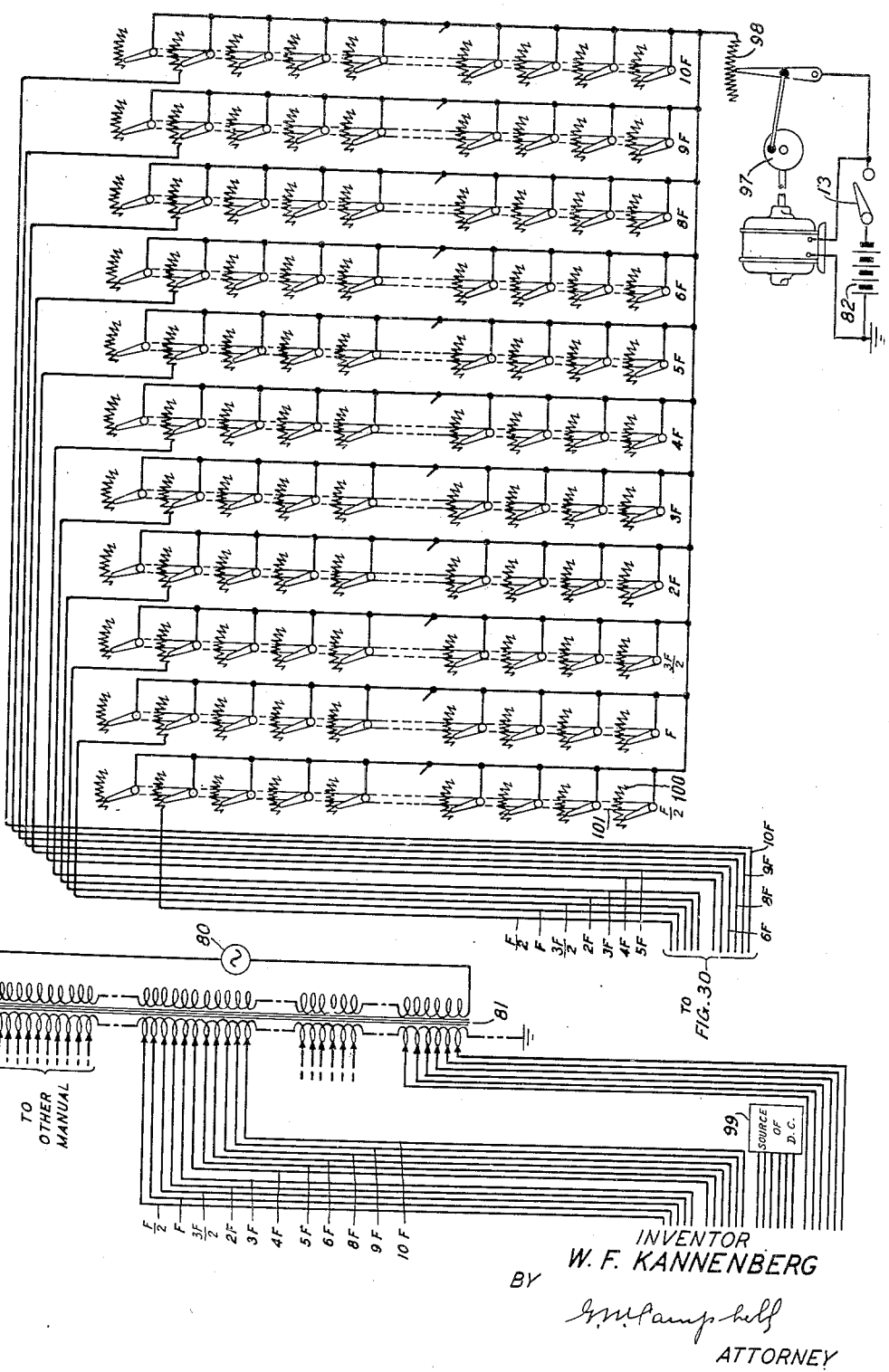

Aug. 15, 1939.  W. F. KANNENBERG  2,169,842
ELECTRONIC ORGAN
Filed April 24, 1936  10 Sheets-Sheet 9

INVENTOR
W. F. KANNENBERG
BY
ATTORNEY

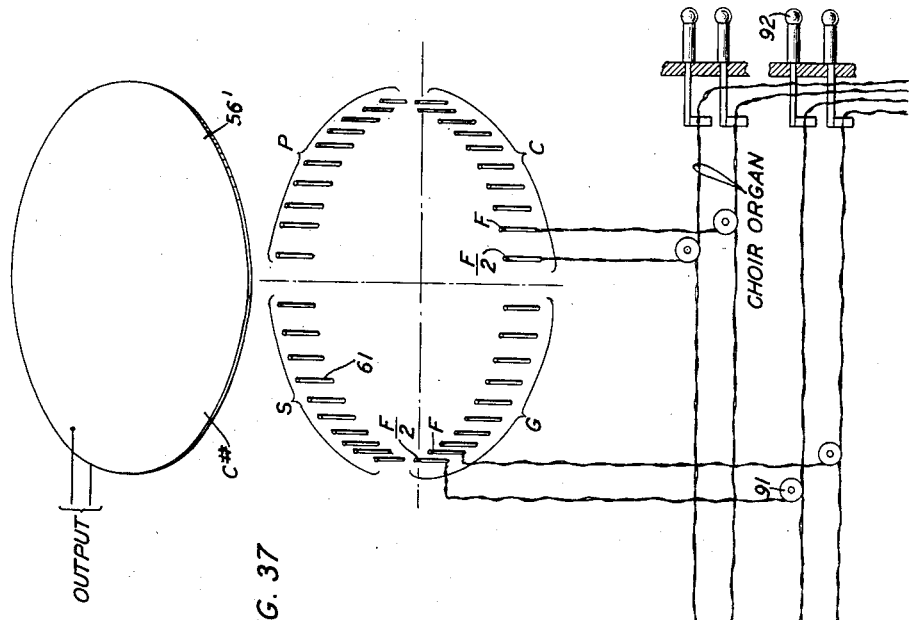
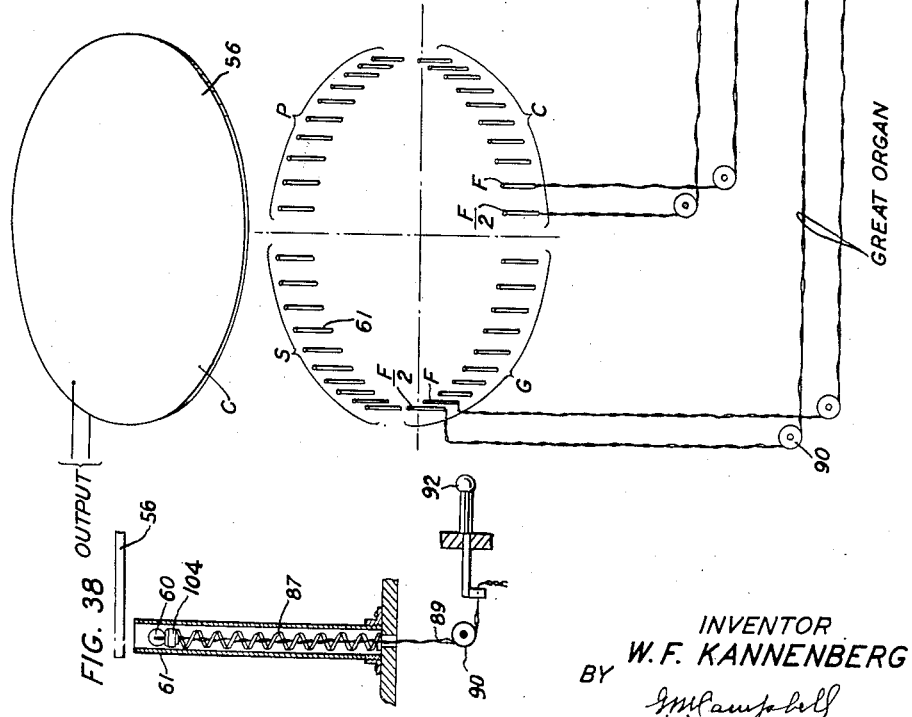

Patented Aug. 15, 1939

2,169,842

UNITED STATES PATENT OFFICE 2,169,842

ELECTRONIC ORGAN

Walter F. Kannenberg, Rutherford, N. J., assignor to Bell Telephone Laboratories, Incorporated, New York, N. Y., a corporation of New York Application April 24, 1936, Serial No. 76,169

9 Claims. (Cl. 84—1.18)

This invention relates to electronic organs, that is, to organs in which the notes and tones are produced by electrical means.

It is the object of this invention to produce an electronic organ which will be perfectly natural in tone quality and keying action, and which will give the organist greater freedom in the selection of tone quality.

An important feature of this invention is a method and apparatus for allocating harmonics so that regardless of the tone qualities selected, there will be no undesirable beat notes produced.

Another important feature is a keying system which avoids the production of thumps and clicks in the reproduced sound.

In a preferred form, this invention comprises a plurality of generators of pure sine wave electrical currents controlled by keys and combination, or quality, stops. The currents are amplified to a suitable degree by distortionless amplifiers and converted into sound by means of high quality electromechanical sound translating devices.

The fundamental frequencies, and the harmonics of these frequencies, are all generated as pure sine waves. The frequency of each harmonic is determined, not by its relation to the fundamental, but by the frequency of the nearest fundamental, and the harmonics, therefore, are not true harmonics, but are synthetic. By using synthetic harmonics, two or more unusual timbres may be played simultaneously without causing disagreeable beat notes.

Keying unaccompanied by clicks is secured by using electrical bridges to control the output from the note generators. The bridges are normally balanced so that no current is diverted to the amplifying circuit, and keying is effected by unbalancing the bridge, for example, by making one of the balance arms of the bridge a photosensitive element and subjecting the element to the action of a key-controlled light beam. With the use of bridges, the circuit from the note generator to the sound translating device is not subject to interruption and hence keying clicks are avoided. Since lamps take an appreciable time to reach full brilliance or complete extinction, the resultant sound builds up and decays smoothly thereby eliminating the thumping effect. In one modification, the time of build-up and decay can be controlled by a proper choice of resistance-capacity timing networks.

The volume of the harmonics relative to the volume of the fundamental is controlled, in general, by varying the intensity of the beam in the photoelectric type of note generator, or by controlling the strength of the operating current. In all cases, notes bearing a corresponding relation to the fundamental are controlled simultaneously.

The complete organ comprises one or more manuals and a pedal organ, with individual volume controls for each manual and the pedal organ.

Referring now to the drawings which accompany this specification and form a part thereof:

Fig. 5 shows a driving means for the note generators;

Fig. 6 shows one unit in the system of note generators of Fig. 5;

Figs. 7, 8 and 9 show various schemes for economizing on light sources and light sensitive elements;

Figs. 12 and 13 show the details of the beam control;

Figs. 14 and 15 show optical wedges to be used for harmonic control;

Fig. 16 shows another form of note generator using a special photoelectric element;

Figs. 17 and 18 show the special photoelectric element of Fig. 16 in detail;

Fig. 19 shows still another form of beam control for a note generator;

Fig. 28 is a chart showing how Figs. 30, 31, 33, 34, 35 and 36 are joined;

Fig. 29 is a detail view of a key of a manual;

Fig. 30 shows the circuit controlled by each key;

Fig. 31 is a continuation of Fig. 30 and shows the connections to the pedal organ;

Fig. 32 shows a key of the pedal organ;

Fig. 33 shows the connections to a percussion organ;

Figs. 34 and 35 are continuations of Fig. 30 and show the power supply thereto;

Fig. 36 shows the harmonics controlled by the keys of the various organs; and

Figs. 37 and 38 show methods of controlling the beam used with the photosensitive surface of Fig. 20.

In order that the description may be simplified and more readily understood it will be divided into seven parts; (1) Tone generator; (2) Description of circuit; (3) Keying methods; (4) Harmonic control; (5) Additional manuals; (6) Tremolo; and (7) Operation.

Tone generator

Figure 3:
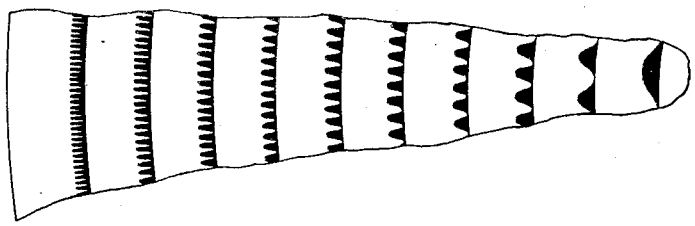
Figs. 1, 2, 3 and 4 show means for generating a note or notes.
Figure 2:
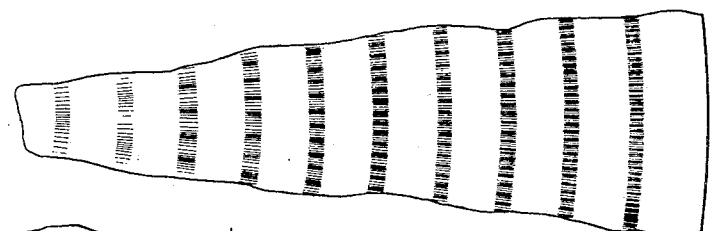
Figure 1:
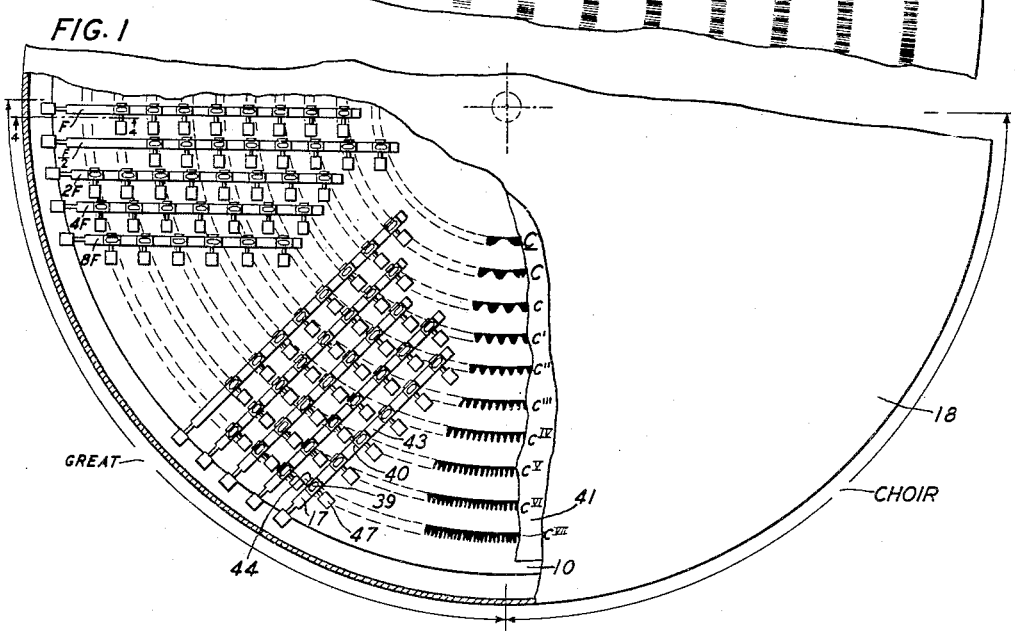

In Fig. 1, 10 is a rotating member which, by way of example, is shown as a disc of translucent material such as glass, Celluloid, etc., with light modulating traces, for example C, C, c, c', etc. formed thereon. The rotating member may take any form which is closed and may be moved past a given point with constant velocity, the particular form selected being a matter of convenience and not essential to the operation of this invention. Each trace is carefully formed to modulate a light beam in such a manner as to produce a pure sine wave. The trace may be of the variable density type as shown in Fig. 2, or of the variable area type as shown in Fig. 3. Cooperating with each trace are one or more light systems, one form of which is shown in cross-section in Fig. 4. Each light system comprises preferably a source of light 39, a lens 40, a mask 41 containing an aperture 42, and a photoelectric cell 46. A shutter 44 and a light wedge 43, the functions of which are hereinafter explained, may be used to control the light beam, and the entire mechanism may be encased in a suitable housing 18. For convenience and ease of control the light systems may be placed in rows, the first, for example, containing only fundamentals, the second, only the half fundamentals, the third, twice the fundamentals, the fourth, four times the fundamentals, etc., the multipliers referring to the frequency of the fundamental in cycles per second. Thus, if a note corresponding to "c" is played, the light system in the next row which cooperates with the C trace will be $$\frac{F}{2}$$

the light system in the third row which cooperates with the c' trace will be 2F, the light system in the fourth row which cooperates with the c'' trace will be 4F, etc. By thus grouping the light systems, all those notes which bear a predetermined harmonic relation to the fundamental may be controlled simultaneously.

In addition to groups which are octaves of the fundamental, other groups which are harmonics of notes other than the fundamentals appearing on disc 10 may be used. For example, a note which is C less seven half notes may have a harmonic $$\frac{3f'}{2}$$

which corresponds to C, a harmonic 3f' which corresponds to "c" and a harmonic 6f' which corresponds to c'. In a like manner a note having a frequency of C less four half notes may have a harmonic 5f'' which corresponds to c' and a note having a frequency of C less two half notes may have a harmonic 9f''' which corresponds to c''. Thus, additional grouping may be used wherever necessary or convenient. One of such groupings is indicated as harmonic control row 17 of the C tone disc in Fig. 1 which is arranged to produce the ninth harmonics for the fundamental tones generated on a similarly arranged A sharp tone disc.

The note generators may be arranged and driven as shown in Fig. 5. Twelve units are used, each unit producing one of the twelve notes of the scale and as many octaves thereof as are necessary to produce the complete range of notes and harmonics to be used in the organ. The units may be driven by means of belts 16 cooperating with soft rubber pulleys 20 secured to a common shaft 21 by means of nuts 22 and lock nuts 23. The soft rubber pulleys serve to eliminate vibration from the drive and hence are conducive to the production of even and noiseless notes. The diameter of the pulley associated with each generator is so chosen that the proper speed relations will be maintained between the various generators. A common driving means such as an electric motor 24, may be used to drive shaft 21.

Fig. 6 is illustrative of a disc which may be used as a note generator. Since the complete organ may comprise three or four separate manuals and hence would require normally three or four sets of twelve-note generators such as shown in Fig. 5, an economy of material can be effected by dividing the note wheel of Fig. 6 into quadrants and assigning each quadrant to one of the manuals. Thus, the quadrants labeled G may be assigned to the great organ, the quadrants labeled C may be assigned to the choir organ, the quadrants labeled P may be assigned to the pedal organ, and the quadrants labeled S may be assigned to the swell organ.

Figure 4:
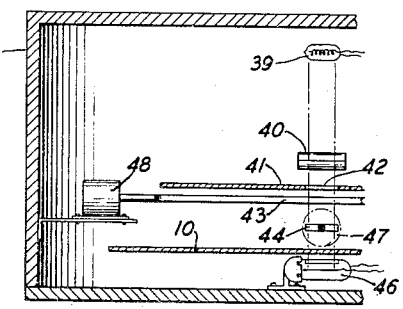

Instead of using an individual light source for each note as shown in Fig. 4, a single lamp 25 and a parabolic reflector 26 may be used as shown in Fig. 7. Likewise, instead of individual photoelectric cells to be used with each note, a parabolic reflector 27 and a single photoelectric cell 28 may be used (Fig. 8). It is also possible, as shown in Fig. 9, to use a single light source and a single photoelectric cell, each cooperating with a parabolic reflector. In the last-mentioned case, however, it may be desirable to drive the note wheel 10 along its periphery, rather than by means of a pulley 20 and shaft 21 as shown in Figs. 5, 7 and 8. In the modifications employing a single light source (Figs. 7 and 9), control of the light beam can be effected by means of shutters shown generally as a box 11. The photoelectric cells of Fig. 7 are located at 12, and the individual light sources of Fig. 8 are shown at 14.

Description of circuit

Figure 10:
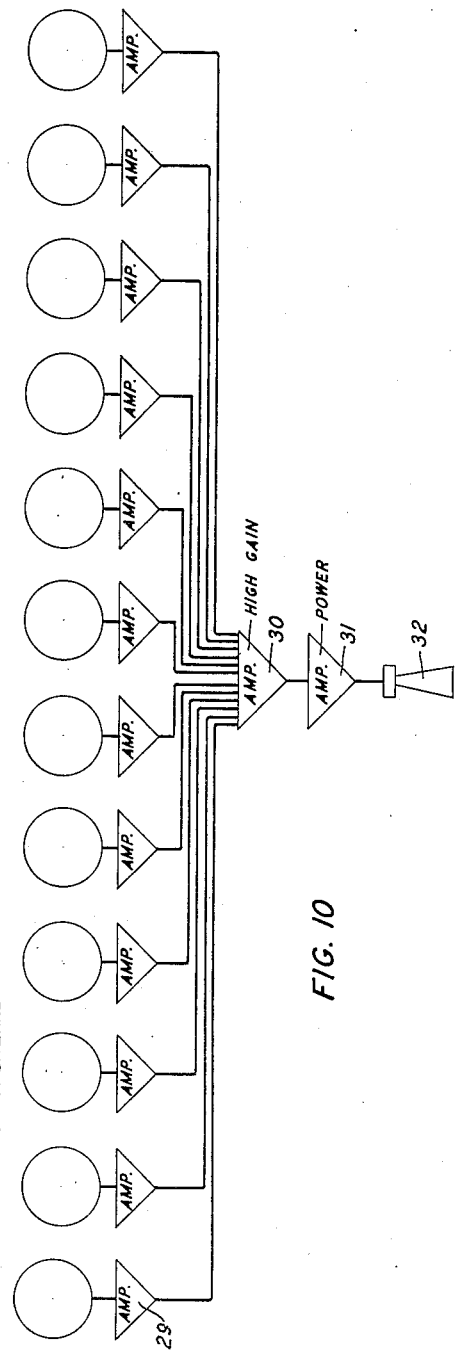
Fig. 10 is a schematic diagram showing the wiring from note generator to the receiver to be used with one form of keying system.

Fig. 10 shows a schematic diagram of the method of wiring the note generators to the sound producing electro-mechanical translating device. Each note wheel 10 cooperates with one or more photoelectric cells as shown in Fig. 4, and the output of the cells is amplified by an amplifier 29 associated with each note wheel. The outputs of all of the amplifiers are combined into a single high gain amplifier 30, a power amplifier 31 and a loud-speaker system generally designated as 32. Each amplifier 29, 30 and 31 is carefully designed to avoid producing harmonics, and the loud-speaker system is one which is capable of reproducing faithfully all of the notes generated by the organ without distortion at any volume level within the range of the instrument. These precautions are necessary to insure complete control of the harmonics at all times.

Figure 11:
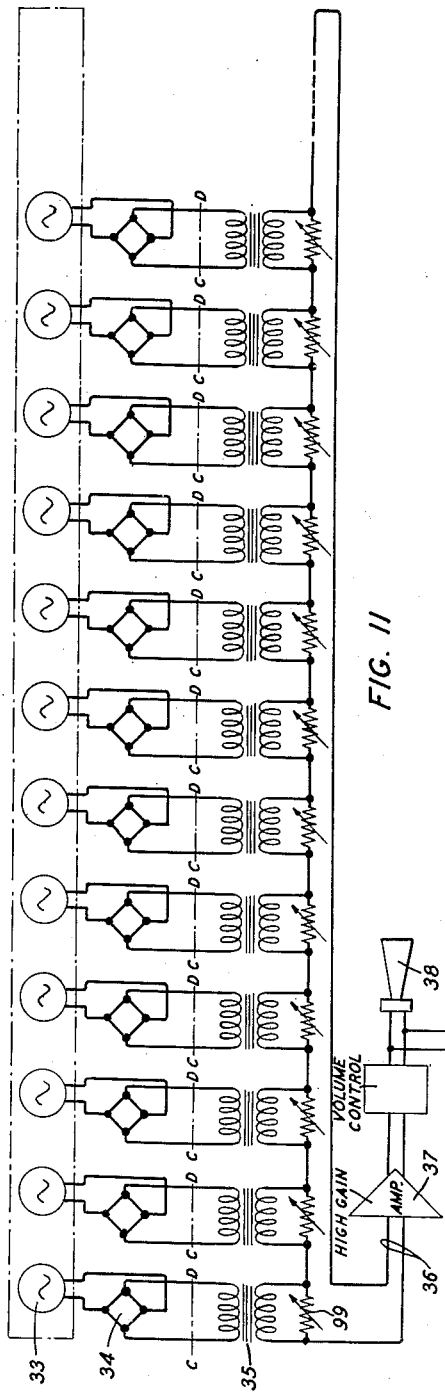
Fig. 11 shows a schematic wiring diagram from note generator to loud-speaker to be used with another form of keying system.

In the modification shown in Fig. 11, 33 is in each case a low impedance generator of a single note, so that if the complete range of the organ comprises one hundred notes, there would be one hundred generators such as 33 in the organ.

The note generator may be any device which is capable of producing a pure sine wave electric current of predetermined frequency. Thus it may be a single trace of a disc such as the one shown in Fig. 1, or it may be an electromagnetic alternator, or any one of the known devices commonly employed as note generators in electronic organs. Each note generator is connected across an electrical bridge 34, the opposite points of which are connected to a transformer 35. The outputs of the transformers 35 are combined into a single circuit 36, amplified by amplifier 37 and translated into sound in loud-speaker 38. As long as a bridge 34 is balanced, the generator 33 associated therewith will be ineffective to produce a note in loud-speaker 38. To produce a note, therefore, it is necessary merely to unbalance bridge 34 in some suitable manner. An advantage in this type of control resides in the fact that the note generator 33 is permanently connected through the circuit to loud-speaker 38 and hence keying clicks, which usually result from the use of circuit interrupters, can be effectively eliminated.

Another advantage resides in the fact that the generator is operated continuously at full load, the unbalancing of the bridge serving merely to divert some of the energy from the generator to another channel. Since the generator is always operated at full load regardless of the number of keys of a manual that are simultaneously depressed, there is no change in volume or frequency with change in the number of keys depressed at the output of the circuit. Various methods which may be used to unbalance bridge 34 will be described hereinafter.

Several organs or manuals are usually employed in the complete organ and since the note generators of Fig. 11 are preferably associated with a single manual, provision for other manuals is made by merely connecting their outputs to the loud-speaker system 38 as shown diagrammatically on Fig. 11. An adjustable high impedance 99 is shunted across the secondary of each transformer 35 to render more stable the input to the amplifier 37.

Keying methods

In any organ two kinds of controls must be provided: (a) note controls, and (b) harmonic controls. The first determines what notes shall be played and the second determines the timbre of the notes played. In Figs. 12 to 27 inclusive are shown various methods of securing note and harmonic control.

In Fig. 12 is shown a light source 39, a converging lens 40, a mask 41 with an aperture 42 therein, an optical wedge 43, a shutter 44, a note trace 45 and a photoelectric cell 46. Shutter 44 is controlled by a solenoid 47, the circuit through which is controlled from a key of the manual. Optical wedge 43 is likewise controlled by a solenoid 48 which moves wedge 43 against the action of spring 49 so that the position of the wedge may be controlled by the strength of the current in solenoid 48. Solenoid 48 is connected to an appropriate harmonic control located at the console of the organ. Wedge 43 is shown in detail in Figs. 14 and 15. It comprises a strip of translucent material preferably in the form of a rectangle which extends across all the traces of a group such as $$\frac{F}{2}$$

Over each trace is a region of varying opacity so that the amount of light passing through to the trace may be progressively varied by changing the position of the wedge. Since an individual shutter is used with each note, and a wedge is used for controlling the amount of light passing through each note trace, a single light source and a single photoelectric cell may be used with each note wheel. The control shown in Fig. 13 is similar to that of Fig. 12 except that the harmonic control is incorporated in the shutter mechanism. The amount of light passing through the trace is controlled in this case by biasing shutter 44 to cause it to open to any intermediate point from fully closed position to fully opened position. The position of shutter 44 is controlled by the position of coil 50 in the field created by the field coil of magnet 51, the position of coil 50 being proportional to the applied voltage thereto. All the shutters in a group, such as $$\frac{F}{2}$$

are given the same bias.

Fig. 16 is similar to Fig. 12 except that the harmonic control is incorporated in the photosensitive element. The element is shown in two forms in Figs. 17 and 18 and comprises copper-oxide or selenium barrier layer photosensitive cells 52 of approximately the same shape as wedge 43. The photosensitive surfaces are arranged longitudinally of the strip, as in Fig. 17, or crosswise of the strip as in Fig. 18 depending upon the shape of the light beam, and in the path of the beam after the beam has been modulated by a trace $c^{VII}$. The strips 52 are mounted on a shaft 53 so that the angle of incidence of the beam with the strip may be varied. Since the photoelectric effect on a barrier layer cell is a maximum when the beam is at right angles to the surface of the cell, rotating the cell about shaft 53 has the same effect as decreasing the amount of light which strikes the cell. The same coil 50 and field magnet 51 may be used to rotate shaft 53 as is used to control shutter 44 of Fig. 13.

In Fig. 19 both the note production and the harmonic control depend upon the brilliance of lamp 39. In this case an individual lamp must be used for each note and harmonic to be produced, and the relative volume of a note and its harmonics is dependent upon the relative brilliance of the note-producing lamp and the harmonics-producing lamps.

In each of the above four cases a separate note is generated each time the note is required, either as a fundamental or as a harmonic. In other words, there are as many individual note generators as there are fundamentals and harmonics to be produced by the entire organ. These keying systems, therefore, lend themselves most readily to a circuit of the type shown in Fig. 10.

Figure 20:
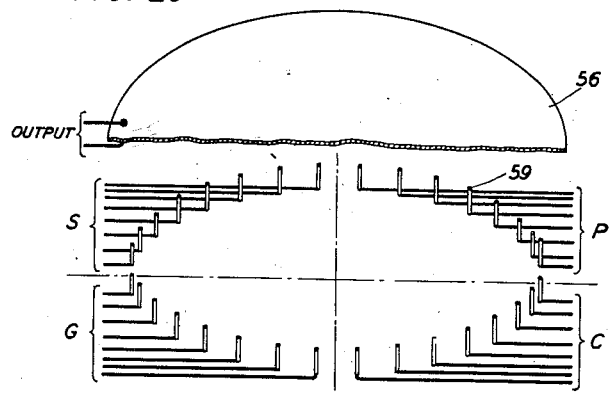
Fig. 20 shows a light sensitive element which may be used with the keying system shown in Fig. 11.
Figure 21:
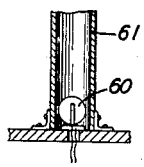
Fig. 21 shows a source of light to be used with the photosensitive element of Fig. 20.
Figure 22:
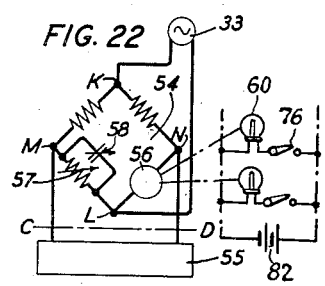
Figs. 22, 23, 24, 25 and 26 show various types of bridges which may be used with the keying system of Fig. 11.

Figs. 20 to 27 show various methods by which the bridges 34 of Fig. 11 may be unbalanced to produce a note or a harmonic in loud-speaker 38. The fundamental scheme is shown in Fig. 22 wherein a tone generator 33 is connected across points KL of a modified Wheatstone bridge 54. The opposite points MN of bridge 54 are connected to the mixing and amplifying circuit which is designated generally by a box 55. The line C—D in Figs. 11 and 22 to 26 indicates the point at which the mixing and amplifying circuit is connected to the various bridges. The bridge is of the resistance type, a resistance being inserted in each of the arms KM and KN and a photosensitive element of the resistance variation type 56 being inserted in arm LN. Resistance 57 in arm ML is made variable to balance the resistance of photosensitive element 56, and a variable capacity 58 is likewise inserted in arm ML to balance such stray capacitance as may be found in the photosensitive element. When no note is to be produced in the output, the resistance and capacity of photosensitive element 56 are exactly balanced by resistance 57 and capacity 58. Each time the note is to be produced, however, the resistance in element 56 is changed and the bridge consequently unbalanced by causing a beam of light to strike the element 56.

Figure 23:
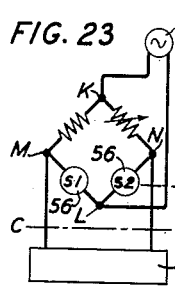

Fig. 20 is an enlarged view of photosensitive element 56 and its cooperating light sources 59. As shown in Fig. 21, the light source may comprise a lamp 60 located within a tube 61 so that its rays emerge from the tube as substantially parallel rays. There are as many such light sources cooperating with a photosensitive element as there are light sources cooperating with the trace corresponding to note generator 33, or stating it another way, there are as many light sources cooperating with a photosensitive element as there are notes of the frequency of generator 33 to be produced on all of the manuals of the organ, either as fundamentals or as harmonics. Any number of lamps 60 may be lit at the same time, the effect of additional lamps being to further unbalance the bridge and hence increase the amount of current in the output circuit of the bridge. In Fig. 23 identical photoelectric elements 56 are used in balance arms ML and LN, the element in arm ML, however, being kept completely in darkness at all times, while the element in arm LN is subject to exposure to the beam of lamp or lamps 60. The object of this arrangement is to eliminate unequal temperature effects in arms ML and LN. Since identical elements are contained in each arm, both arms will be affected in an identical manner by changes in temperature and hence temperature changes will not cause the bridge to be unbalanced.

Figure 24:
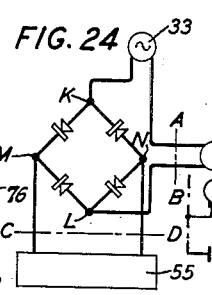
Figures 25, 26:
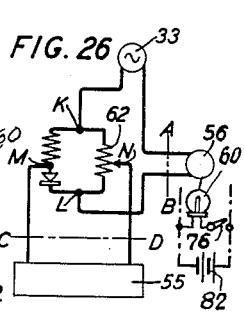

In Figs. 24, 25 and 26, light sensitive element 56 is in series with generator 33 and various types of bridges are used therewith. For example, a bridge consisting solely of copper-oxide rectifier elements may be used as in Fig. 24. In the bridge of Fig. 25 two copper-oxide rectifier elements and a potentiometer are used. In the bridge of Fig. 26 one copper-oxide rectifier element, one fixed resistance and one potentiometer are used. The type of bridge selected depends largely upon the cost of the components of the bridge.

Figure 27:
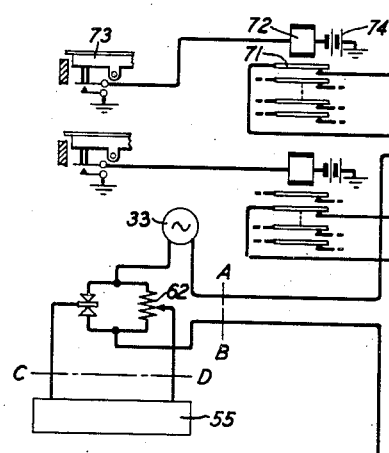
Fig. 27 shows a keying system.
Figure 36:
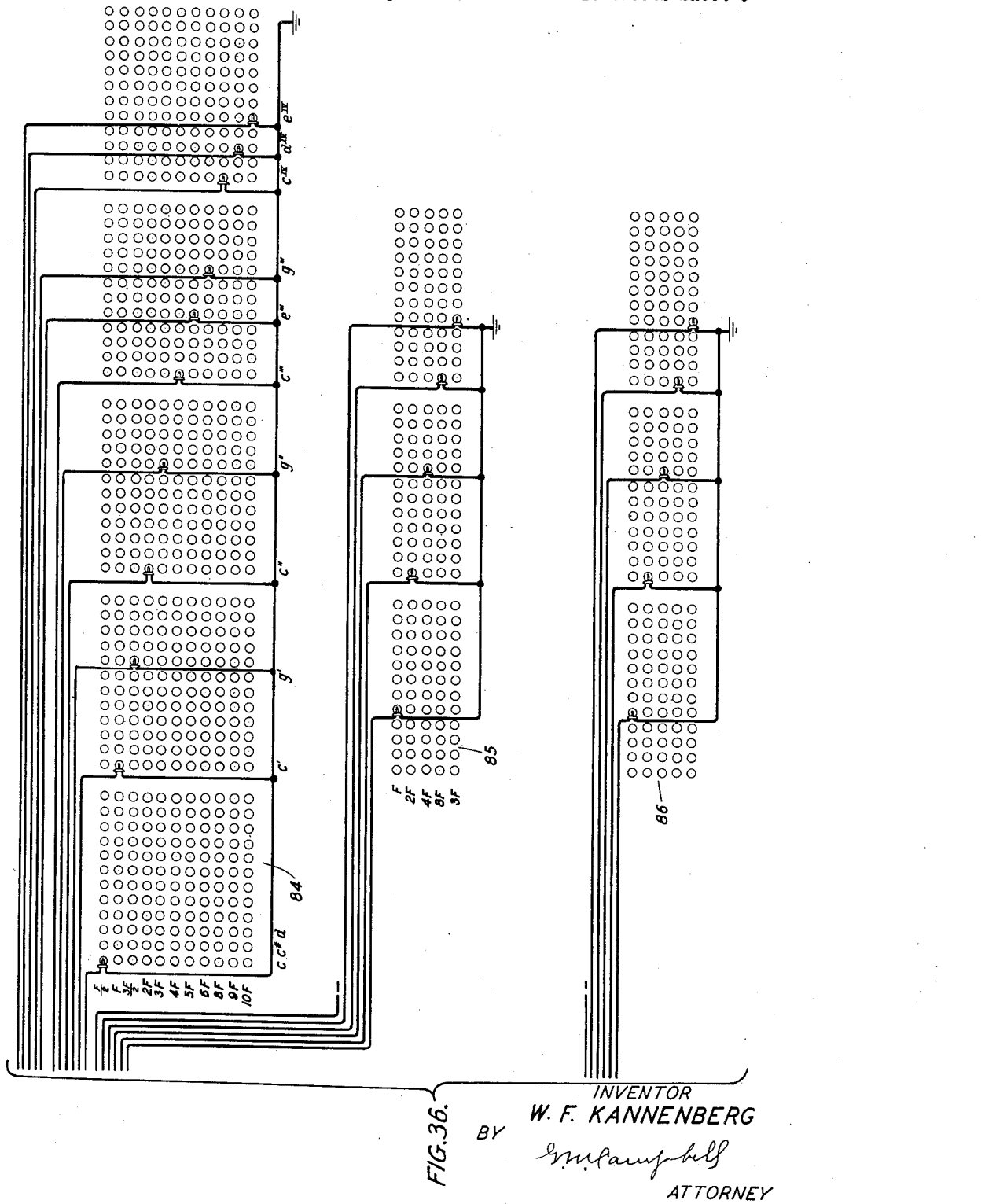

Fig. 27 shows an alternative keying scheme which may be used in place of the one employing light sensitive element 56 in a bridge type of control similar to that of Fig. 25. Direct current bias to unbalance these bridges may be supplied through resistance-capacity filter networks to give any desired speed of build-up for the note. By this means the low frequency notes may be adjusted to build up more slowly than the high frequency notes and thus more closely imitate pipe organ effects than is conveniently possible by means of lamps and photosensitive elements. As in Figs. 25 and 26, a potentiometer 62 is used to balance the bridge to zero when no bias voltage exists. A source of alternating current 63 is connected to the primary of transformer 64, the secondary of which is divided into a series of steps designed to supply the necessary direct current bias to the bridge. The amount of bias determines the loudness of the tone and is proportional to the control bus voltage. The voltage on the control buses may be varied to suit the tone quality desired by shifting the transformer steps, by resistors, or otherwise. In the circuit illustrated in Fig. 27, the voltage is varied by shifting the transformer steps. The secondary of transformer 64 is coupled to the remainder of the circuit through a second transformer 65, the current then being rectified in copper-oxide rectifier 66, filtered in network 67 and then connected to the timing circuit. The time constant of resistance 68 and condenser 69 determines the speed of build-up of a note. The time constant of resistance 70 and condenser 69 determines the time of decay. The direct current bias is introduced into the bridge by breaking the circuit at contact 71, the circuit at this contact being normally completed. Contact 71 may be one of a number of contacts controlled by a relay 72 which, in turn, is operated by a key 73 of a manual of the organ. Key 73 serves to put ground on one side of relay 72 and thus completes the circuit through battery 74 back to ground. Since note generator 33 can produce but one note, it can be connected to any key 73 of a manual but once. However, the same note may be a harmonic of another note and hence it may be connected to as many different keys as there are harmonics of that frequency required in the organ.

In addition to providing a delay in the rate of change of energy in the associated circuits, the resistance-capacity networks serve to reduce hum from the power supply.

Harmonic control

Thus far the description has been concerned with methods and apparatus for producing a single note and to means for controlling the note so produced. The succeeding description concerns itself with means and methods for combining the notes to produce tones of various timbres. The chart of Fig. 28 may be used as a guide to show how Figs. 30, 31, 33, 34, 35 and 36 are joined.

Referring now to Figs. 28 to 36, inclusive, Fig. 30 shows a manual of an organ containing, let us say, five octaves beginning and ending with C. As shown in Fig. 29, each key serves to complete a circuit through leads 74 and 75, lead 74 being a common ground and lead 75 being individual to each key. Lead 75 is connected to one side of a relay 76, the other side of which is connected to a source of current 77 and then back to ground. There are as many relays 76 as there are keys in the organ. Each relay has a plurality of contacts, one for the fundamental and one for each harmonic to be combined with the fundamental. For convenience, these may be labeled $$\frac{F}{2}, F, \frac{3F}{2}, 2F, 3F, 4F, 5F, 6F, 8F, 9F \text{ and } 10F$$

Each of these harmonics is so chosen that it corresponds exactly in frequency to the frequency of a note of the scale. They are not true harmonics, but synthetic harmonics, and are so chosen to avoid unpleasant beat notes when tones of unusual timbre are played simultaneously. Since the seventh harmonic does not fall readily upon any note of the scale it has been omitted, but the system herein described is sufficiently flexible so that it could be incorporated should it be desired to do so. To produce the seventh harmonic, however, an extra note wheel in addition to the twelve shown in Fig. 5 would be necessary.

A resistance 78 and a condenser 79 in series are connected across each relay to reduce arcing.

A source of current supply and an alternative source are shown in Figs. 34 and 35. In Fig. 34 a generator 80 supplies current to a transformer 81, the secondary of which is divided into a number of taps which are connected to the contacts as shown. There is one set of buses $$\frac{F}{2}, F, \frac{3F}{2}, \text{etc.},$$

for each manual, and each bus is connected to every key in its manual. This type of current source is used when harmonic control is to be provided by lamp brilliance and direct current may not be desired because of the many resistances to be mechanically coupled together. The frequency of source 80 is chosen so that it is above the audible range or at least so that it will produce no detectable flicker in the lamps.

When harmonic control is to be provided by lamp brilliance and it is desired to use direct current, a separate variable resistance is provided in each lamp lead, harmonic control being obtained by the resistance for all $$\frac{F}{2}$$

lamps, etc., being mechanically coupled together. Such an arrangement is shown in Fig. 35 wherein 82 is a common battery controlled by switch 13 which supplies current to as many groups of resistances 100 as there are fundamentals and harmonics in each keying relay circuit. All resistances 100 in a particular harmonic group such as $$\frac{F}{2}$$

for example are mechanically coupled together by a common shaft 101 or other suitable linkage, the control appearing at the console as knobs such as 92 in Fig. 37. There are as many resistances 100 in a group as there are keys on a manual.

In a similar manner each key of the pedal organ 102 (Fig. 31) operates a single contact 103 as shown in Fig. 32, which in turn operates a keying relay 83 the contacts of which may be connected to the source of current shown in Fig. 34. The right-hand side of the contacts of keying relay 83 are connected to the note generators, shown in Fig. 36 for convenience in illustrating the connections as lamps arranged in vertical and horizontal rows. The first group 84 is associated with the manual shown in Fig. 30 and the second group 85 is associated with the pedal organ. The third group 86 is associated with the percussion manual which will be described later. Using middle C (frequency 256 cycles per second) as an example and using an 8 foot stop basis for the key designation nomenclature $$\frac{F}{2}$$

becomes $c$, F becomes $c'$, $$\frac{3F}{2}$$

becomes $g'$, 2F becomes $c''$, 3F becomes $g''$, 4F becomes $c'''$, 5F becomes $e'''$, 6F becomes $g'''$, 8F becomes $c^{IV}$, 9F becomes $d^{IV}$ and 10F becomes $e^{IV}$. The contacts associated with each keying relay are thus connected to one lamp in each horizontal row, the particular lamp selected in each row bearing the same relation to the fundamental as the lamps just described bear to $c'$. The lamps for $c\#'$, for example, will be spaced one row to the right of the lamps for $c'$. There is absolutely no distinction between a note used as a harmonic and a note used as a fundamental since all the lamps in a vertical row produce notes of identical frequencies.

In a similar manner the fundamentals and associated harmonics of the pedal organ are connected to lamps in group 85. The total number of lamps required in a vertical row is equal to the number of harmonics to be synthesized plus one lamp for the fundamental.

Another form of harmonic control is shown in Figs. 37 and 38. This form is to be used with the photosensitive surface 56 of Fig. 20. Volume control may be obtained by varying the amount of light which strikes surface 56. One way to secure this variation is to vary the distance between the light source and surface 56. As shown in Fig. 38, the light is mounted upon a piston 104 supported by a spring 87 which tends to raise lamp 60 to the top of tube 61. The position of lamp 60 in tube 61 is determined by the tension in cord 89 which may be either one of the leads to the lamp or a separate cord. The lamps associated with any one light sensitive element 56 may be divided into as many groups as there are manuals in the organ. Since it is desirable to have independent harmonic control for each manual and since each light sensitive element produces but one note, individual cords should be used for each lamp associated with a single light sensitive element. The $$\frac{F}{2}$$

lamp of the great organ of the C group, however, may be mechanically coupled to the $$\frac{F}{2}$$

lamp of the great organ of the C# group, etc. This may be accomplished by passing the cords of corresponding lamps over pulleys 90 and 91 and uniting the cords at a single control 92 at the console of the organ. This type of harmonic control is continuous and entirely eliminates the clicks associated with switching methods.

In all of the above harmonic control methods each harmonic is controlled from an individual dial, lever or bar at the console, and the standard organ stops may be marked on each control to facilitate the selection of the stop. It is entirely possible to secure predetermined combinations of control settings automatically by the operation of a single key employing remote control and preselection devices such as are used in radio receiving sets.

*Additional manuals*

In the larger organs it may be desirable to include percussion or other unusual effects. This may be accomplished most readily by incorporating these effects into a separate manual. Fig. 33 shows the connections to a representative keying relay 100 of a percussion manual. Percussion effects are obtained by discharging a condenser 93 through a resistance 94, a dummy load resistance 95 being inserted to reduce the effect of the discharge upon the remaining circuits. The direct current source for charging condenser 93 shown as a square 99 in Fig. 34 may be either a battery such as is shown in Fig. 35 or a rectifier and filter alternating current such as is shown in Fig. 27. The particular notes to be associated with the contacts of the relay are determined by making a frequency analysis of the tone to be simulated. Adequate provision must be made in the note generator of Fig. 1, or the light sensitive element of Fig. 22, or the direct current bias of Fig. 27, to accommodate the additional note generators required for the special organ.

Each manual is equipped with an individual volume control as shown in Fig. 11 so that its output level may be varied with respect to the remaining manuals. This may also be accomplished by simultaneously shifting the buses of a manual from one set of taps (Fig. 34) on transformer 81 to some other set at a different voltage. These volume controls may be brought out as foot-pedals at the console in the usual manner.

Tremolo

For certain timbres it is desirable to introduce tremolo. Where direct current is used, as in Fig. 35, a small motor- operated eccentric 97 may be used to continuously vary the resistance of rheostat 98. Other methods of continuously varying the volume of the note will suggest themselves to those skilled in the art.

Operation

The operation of the organ is believed to be self-explanatory. The note generators are rotated, thereby making available a required number of electrical currents of sine wave form. The particular currents to be used are selected by means of the keys on the manuals and pedal board, and the strengths of the currents are determined by the volume and harmonic controls. The currents are amplified to the necessary degree in high gain and power amplifiers and are translated into sound at the loudspeaker.

Summary

In conclusion, certain improvements relating to electronic organs have been described, and these improvements result in an organ possessing many advantages over similar organs now known to the art.

One of the advantages of the keying method and harmonic control described is the great flexibility secured in the selection of tones. Each note, whether a harmonic or fundamental, is separately generated and controlled and hence a large variety of tone colors is possible.

In electronic organs which permit a greater range of harmonic control than the standard pipe or reed organs, it is possible to obtain combinations of tones in which the component notes may clash. By generating the harmonics as standard notes, and by generating the standard notes as pure sine waves, this disagreeable clash can be readily avoided.

Since electrical organs are generally controlled by making or breaking a circuit, such organs tend to introduce clicks into the receivers when the keys and harmonic controls are actuated. By the use of this invention means are provided for controlling both the generation of a note and the harmonic combination of notes without the interruption of a circuit, and hence keying and harmonic control may be effected without the production of clicks.

In addition to these advantages there is also the advantage of continuous harmonic control as contrasted with the control by steps, or gradations, which is generally practised not only in electronic organs, but in the usual pipe and reed organs.

It is understood that the above description is merely illustrative of the invention and that the invention is not to be limited thereby, but is to be determined by the appended claims.

What is claimed is:

1. In a photoelectric tone generator comprising a light sensitive cell and a source of light, means for controlling the output from said generator, said means comprising a closure, a piston adapted to slide within the closure, resilient means for biasing the piston to move toward one end of said closure, a lamp mounted upon said piston to cooperate with the light sensitive cell, an electroconductive cord connected to said lamp, and means for varying the tension on said cord to vary the position of the lamp within the closure and thereby vary the amount of light striking the light sensitive element.

2. In an electronic organ, means for producing tones of any desired timbre comprising means for producing electrically a range of fundamental notes, means for producing electrically a series of harmonics for each fundamental note, and substantially stepless means for controlling simultaneously and noiselessly corresponding harmonics of each note in the range, said controlling means comprising variable electrical resistances and lamps associated with each note and harmonic-producing means, said resistances adapted to severally control the intensities of their associated lamps, and mechanical means for simultaneously controlling the resistances of corresponding harmonics of each note.

3. In an electronic tone producer, an electrical generator for producing a low power level alternating current of predetermined frequency, an output circuit, a balanced electrical bridge containing asymmetrical non-linear elements for controlling the output from the current generator, and means in series with the current generator for introducing a biasing current of relatively higher power level into the bridge to unbalance the bridge and permit current to flow into the output circuit.

4. In an electronic tone producer, an electrical generator for producing a low power level alternating current of predetermined frequency, an output circuit, a balanced electrical bridge containing asymmetrical non-linear elements for controlling the output from the current generator, and key-controlled means in series with the current generator for gradually introducing biasing current of relatively higher power level into the bridge to unbalance the bridge and cause the current which flows into the output circuit to build up gradually.

5. In an electronic tone producer, an electrical generator for producing a low power level alternating current of predetermined frequency, an output circuit, a balanced electrical bridge containing asymmetrical non-linear elements for controlling the output from the current generator, and means in series with the generator for gradually introducing biasing current of relatively higher power level into the bridge to unbalance the bridge and cause the current which flows into the output circuit to build up gradually, said means comprising a plurality of key-controlled circuits, each including a series resistance and a shunt capacitance for controlling the rate of change of energy in said circuits.

6. In an electronic organ, a plurality of electrical generators for producing currents of predetermined frequencies, an output circuit, a balanced electrical bridge for each generator for controlling the output from the generators, and means in series with each generator for introducing biasing current into the associated bridge to unbalance said bridge and permit current to flow into the output circuit, said means comprising a plurality of key-controlled circuits, each including a series resistance and a shunt capacitance, the resistance and capacitance being different for each frequency to give different rates of change of energy for each frequency.

7. In an electronic tone producer, an electrical generator for producing a current of predetermined frequency, an output circuit, a balanced electrical bridge for controlling the output from the current generator, and means in series with the generator for introducing biasing current into the bridge to unbalance the bridge and permit current to flow into the output circuit, said means comprising a plurality of key-controlled circuits, each including a source of direct current, a shunt capacitance, a shunt resistance and a series resistance, the shunt resistance in combination with the capacitance serving to determine the time of decay of a tone, and the series resistance in combination with the capacitance serving to determine the time of build-up of a tone.

8. In an electronic organ having an equally tempered chromatic scale, a plurality of photoelectric sine wave current generators comprising a source of light, a beam of light produced thereby, a disc containing a series of traces adapted to modulate a light beam in accordance with a sine wave, any one of said traces corresponding to a fundamental pitch of one of the equally tempered notes of said scale and all others being octaves thereof, beam control mechanisms arranged in rows across the traces, one row for the fundamentals and one row for each harmonic, interconnecting means adapted to simultaneously operate the respective harmonic beam control mechanisms in the several rows upon the keying of their fundamental control mechanism, and a variable light screen for each row to gradually, uniformly and simultaneously control the beams in each row.

9. In an electronic organ having an equally tempered chromatic scale, twelve photoelectric sine wave generators, one for each note of said scale, each generator comprising a source of light, a beam of light produced thereby, a disc containing a series of traces adapted to modulate a light beam in accordance with a sine wave, any one of said traces corresponding to a fundamental pitch of one of the equally tempered tones of said scale and all others being octaves thereof, beam control mechanisms arranged in rows across the traces, one row for the fundamentals and one row for each harmonic, interconnecting means adapted to simultaneously operate the respective harmonic beam control mechanisms in the several rows of all generators upon the keying of their fundamental control mechanism, and a variable light screen for each row to gradually, uniformly and simultaneously control the beams in each row.

WALTER F. KANNENBERG.